US008837468B1

(12) United States Patent
Lo et al.

(10) Patent No.: US 8,837,468 B1
(45) Date of Patent: *Sep. 16, 2014

(54) NETWORK DEVICE AND METHOD FOR POWERING A MEDIA ACCESS CONTROLLER

(71) Applicant: Marvell International Ltd., Hamilton (BM)

(72) Inventors: William Lo, Cupertino, CA (US); Ozdal Barkan, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/730,085

(22) Filed: Dec. 28, 2012

Related U.S. Application Data

(63) Continuation of application No. 11/971,612, filed on Jan. 9, 2008, now Pat. No. 8,345,673.

(60) Provisional application No. 60/886,386, filed on Jan. 24, 2007.

(51) Int. Cl.
  *H04L 12/50* (2006.01)
  *H04L 12/28* (2006.01)
  *H04L 12/66* (2006.01)
  *H04J 3/16* (2006.01)
  *G06F 1/00* (2006.01)
  *H04L 29/08* (2006.01)
  *G06F 1/32* (2006.01)
  *G06F 1/26* (2006.01)

(52) U.S. Cl.
  CPC ............ *G06F 1/26* (2013.01); *H04L 29/08099* (2013.01); *G06F 1/3287* (2013.01)

USPC .......... 370/366; 370/410; 370/463; 370/469; 713/310; 713/324

(58) Field of Classification Search
  CPC .................. H04L 29/08009–29/08027; G06F 1/32–1/3209-1/3234-1/3296
  USPC ........... 370/366, 410, 463, 469; 713/300–330
  See application file for complete search history.

(56) References Cited

U.S. PATENT DOCUMENTS 5,404,544 A * 4/1995 Crayford ........................ 713/310
5,938,771 A * 8/1999 Williams et al. .............. 713/310

(Continued)

OTHER PUBLICATIONS

Advanced Micro Devices; "Magic Packet Technology"; White Paper; Publication# 20213; Rev: A; Amendment/0; Issue Date: Nov. 1995; 6 pages.

(Continued)

*Primary Examiner* — Un C Cho
*Assistant Examiner* — Jeremy Costin

(57) ABSTRACT

A network device including a physical layer device and a media access controller. The physical layer device includes a first interface, and is configured to receive packets including a first packet and a second packet. The media access controller includes a second interface connected to the first interface of the physical layer device. The physical layer device is configured to: in response to the first packet, generate a power signal; transition at least one of the first interface and the second interface from being powered OFF to being powered ON; and output the power signal to the media access controller. The media access controller is configured to: receive the power signal; in response to the power signal, transition from being powered OFF to being powered ON; and subsequent to being powered ON, receive the second packet from the physical layer device via the first interface and the second interface.

19 Claims, 2 Drawing Sheets

(56) References Cited

U.S. PATENT DOCUMENTS

| | | | |
|---|---|---|---|
| 6,223,284 B1* | 4/2001 | Novoa et al. | 713/100 |
| 6,266,696 B1* | 7/2001 | Cromer et al. | 709/224 |
| 6,463,542 B1* | 10/2002 | Yu et al. | 713/320 |
| 7,356,047 B1* | 4/2008 | Mahalawat et al. | 370/469 |
| 2002/0157030 A1* | 10/2002 | Barker et al. | 713/320 |
| 2003/0126486 A1* | 7/2003 | Bui | 713/320 |
| 2003/0179709 A1* | 9/2003 | Huff | 370/248 |
| 2003/0206564 A1* | 11/2003 | Mills et al. | 370/528 |
| 2004/0028074 A1* | 2/2004 | Huff et al. | 370/463 |
| 2005/0025067 A1* | 2/2005 | Jones et al. | 370/254 |
| 2005/0097378 A1* | 5/2005 | Hwang | 713/320 |
| 2006/0282690 A1* | 12/2006 | Cromer et al. | 713/300 |
| 2007/0106920 A1* | 5/2007 | Lee et al. | 713/320 |

OTHER PUBLICATIONS

IEEE STD 802.3TM-2002 (Revision of IEEE STD 802.3, 2000 Edition); IEEE Standard for Information technology—Telecommunications and information exchange between systems—Local and metropolitan area networks—Specific requirements; Part 3: Carrier sense multiple access with collision detection (CSMA/CD) access method and physical layer specifications; Section One—pp. 1-576; Section Two—pp. 1-582; Section Three—pp. 1-379; IEEE Computer Society; Sponsored by the LAN/MAN Standards Committee; Mar. 8, 2002.

* cited by examiner

NETWORK DEVICE AND METHOD FOR POWERING A MEDIA ACCESS CONTROLLER

CROSS-REFERENCE TO RELATED APPLICATIONS

The present disclosure is a continuation of U.S. patent application Ser. No. 11/971,612 filed on Jan. 9, 2008 (now U.S. Pat. No. 8,345,673). This application claims the benefit of U.S. Provisional Application No. 60/886,386 filed on Jan. 24, 2007. The entire disclosures of the applications referenced above are incorporated herein by reference.

BACKGROUND

The present invention relates generally to data communications. More particularly, the present invention relates to a physical-layer device (PHY) having a serial interface and a magic packet circuit.

To conserve energy, many personal computers (PC) currently employ sleep modes that cause the PC to power off when not in use, for example at night or after a period of inactivity. However, these periods of inactivity are the ideal time for system administrators to perform software updates, hard drive backups, and the like.

Conventional magic packet technology permits a PC to be awoken from sleep mode remotely. According to this technology, the PC places an Ethernet controller in magic packet mode before the PC enters sleep mode. While in magic packet mode, the Ethernet controller, which includes a media access controller (MAC) and a PHY, remains awake while the PC sleeps, transmits no packets, and essentially ignores all incoming packets except magic packets, which are packets that include a particular predetermined pattern. Upon receiving a magic packet, the MAC wakes the PC (e.g., powers on the PC).

In systems where the Ethernet PHY and MAC are implemented or integrated on separate chips, the PHY and MAC are traditionally connected via a Gigabit Media Independent Interface (GMII), Reduced GMII (RGMII), or Serial GMII (SGMII) interface. The GMII and RGMII interfaces do not consume much power when there is no traffic, but require many more pins than the SGMII interface. The SGMII interface has the advantage of fewer pins, but consumes the same amount of power regardless of the operating speed of the PHY or the presence or absence of traffic.

Of course, it is desirable for the Ethernet controller to minimize power consumption while in magic packet mode. However, as mentioned above, an SGMII interface consumes the same amount of power despite the near absence of traffic in magic packet mode. In addition, the SGMII interface must remain active during magic packet mode in order to pass magic packets from the PHY to the MAC, where the magic packet circuit traditionally resides.

SUMMARY

In general, in one aspect, an embodiment features an apparatus comprising: a physical-layer input circuit to receive first signals representing first data; a first serializer to transmit a serial stream of the first data; and a magic packet circuit to generate a magic packet signal when the first data includes a magic packet.

Embodiments of the apparatus can include one or more of the following features. Some embodiments comprise a first Serial Gigabit Media Independent Interface (SGMII) comprising the first serializer, and a first deserializer to receive a serial stream of second data; a physical-layer output circuit to transmit second signals representing the second data; and a first power control circuit to power off the first SGMII interface based on a magic packet mode signal, and to power on the first SGMII interface based on the magic packet signal. Some embodiments comprise a physical-layer device comprising the apparatus. In some embodiments, the physical-layer device is compliant with all or part of IEEE standard 802.3, including draft and approved amendments. Some embodiments comprise an integrated circuit comprising the physical-layer device. Some embodiments comprise a network device comprising: the physical-layer device; and a media access controller comprising a second SGMII interface to receive the serial stream of the first data, and to transmit the serial stream of the second data, and a second power control circuit to power off the second SGMII interface based on the magic packet mode signal, and to power on the second SGMII interface based on the magic packet signal. In some embodiments, the second power control circuit powers off the media access controller based on the magic packet mode signal, and powers on the media access controller based on the magic packet signal. In some embodiments, the network device is selected from the group consisting of: a network switch; a router; and a network interface controller. Some embodiments comprise a personal computer comprising the network device.

In general, in one aspect, an embodiment features a method comprising: receiving, into a physical-layer device, signals representing first data; transmitting, from the physical-layer device, a serial stream of the first data; and generating, in the physical-layer device, a magic packet signal when the first data includes a magic packet.

Embodiments of the method can include one or more of the following features. In some embodiments, the physical-layer device comprises a first Serial Gigabit Media Independent Interface (SGMII) to transmit the serial stream of the first data and to receive a serial stream of second data; and wherein the method further comprises powering off the first SGMII interface based on a magic packet mode signal, and powering on the first SGMII interface based on the magic packet signal. In some embodiments, the physical-layer device is compliant with all or part of IEEE standard 802.3, including draft and approved amendments. Some embodiments comprise powering off a second SGMII interface in a media access controller based on the magic packet mode signal, wherein the second SGMII interface receives the serial stream of the first data and transmits the serial stream of the second data; and powering on the second SGMII interface based on the magic packet signal. Some embodiments comprise powering off the media access controller based on the magic packet mode signal; and powering on the media access controller based on the magic packet signal.

In general, in one aspect, an embodiment features an apparatus comprising: physical-layer input means for receiving first signals representing first data; first serializer means for transmitting a serial stream of the first data; and magic packet means for generating a magic packet signal when the first data includes a magic packet.

Embodiments of the apparatus can include one or more of the following features. Some embodiments comprise first Serial Gigabit Media Independent Interface (SGMII) means for interfacing comprising the first serializer means, and first deserializer means for receiving a serial stream of second data; physical-layer output means for transmitting second signals representing the second data; and first power control means for powering off the first SGMII means based on a magic packet mode signal, and for powering on the first SGMII means based on the magic packet signal. Some embodiments comprise a physical-layer device comprising the apparatus. In some embodiments, the physical-layer device is compliant with all or part of IEEE standard 802.3, including draft and approved amendments. Some embodiments comprise an integrated circuit comprising the physical-layer device. Some embodiments comprise a network device comprising: the physical-layer device; and a media access controller comprising second SGMII means for receiving the serial stream of the first data, and for transmitting the serial stream of the second data, and second power control means for powering off the second SGMII means based on the magic packet mode signal, and for powering on the second SGMII means based on the magic packet signal.

The details of one or more implementations are set forth in the accompanying drawings and the description below. Other features will be apparent from the description and drawings, and from the claims.

Figure 1:
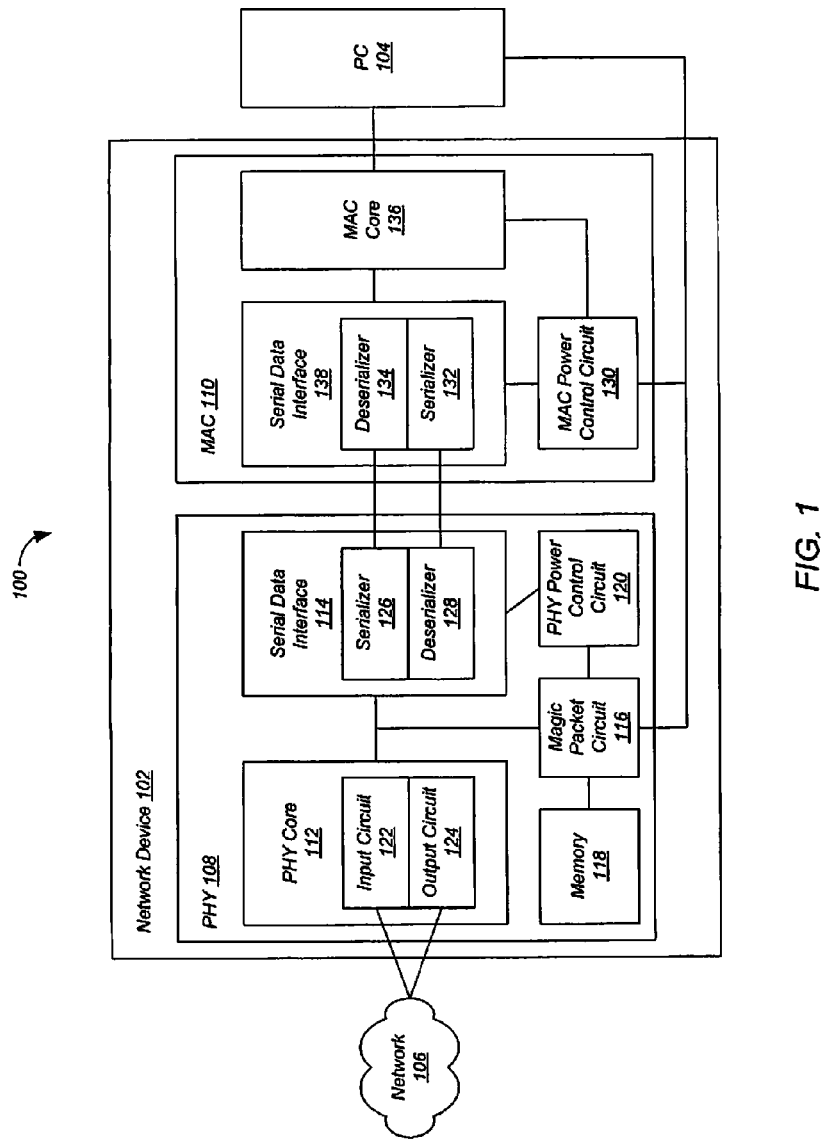
FIG. 1 shows a data communication system comprising a network device in communication with an Ethernet network and a personal computer (PC) according to some embodiments of the present invention.

The leading digit(s) of each reference numeral used in this specification indicates the number of the drawing in which the reference numeral first appears.

DESCRIPTION

Embodiments of the present invention provide physical-layer devices (PHY) having a magic packet circuit and a serial interface such as a Serial Gigabit Media Independent Interface (SGMII). Because the magic packet circuit resides in the PHY, the serial interface can be powered off while in magic packet mode because the magic packets need not be passed to the MAC. According to these embodiments, the MAC can be powered off as well, further conserving power. Embodiments of the present invention are especially useful with serial interfaces such as SGMII that continue to consume power even when little or no traffic is present.

FIG. 1 shows a data communication system 100 comprising a network device 102 in communication with a network 106 and a personal computer (PC) 104 according to some embodiments of the present invention. Network device 102 can be compliant with all or part of IEEE standard 802.3, including draft and approved amendments. In other embodiments, other sorts of network devices can replace network device 102, such as routers, switches, and the like, and the network 106 can be an Ethernet network or other type of network.

Although in the described embodiments, the elements of data communication system 100 are presented in a particular arrangement, other embodiments may feature other arrangements. For example, the elements of data communication system 100 can be implemented in hardware, software, or combinations thereof. As another example, network device 102 can be implemented as part of PC 104, for example on a motherboard of PC 104.

Network device 102 includes a PHY 108 and a MAC 110, which can be implemented as separate integrated circuits, that communicate over a serial interface such as SGMII. PHY 108 includes a PHY core 112, a serial data interface 114 in communication with PHY core 112 and MAC 110, a magic packet circuit 116, a memory 118, and a PHY power control circuit 120. PHY core 112 includes an input circuit 122 and an output circuit 124 in communication with network 106. Serial data interface 114 includes a serializer 126 and a deserializer 128. In one implementation, PHY core 112, serial data interface 114, magic packet circuit 116, memory 118, and PHY power control circuit 120 are integrated onto a same chip.

MAC 110 includes a MAC core 136, a serial data interface 138, and a MAC power control circuit 130. Serial data interface 138 includes a serializer 132 in communication with deserializer 128 of PHY 108, and a deserializer 134 in communication with serializer 126 of PHY 108. In one implementation, MAC core 136, serial data interface 138, and MAC power control circuit 130 are integrated onto a same chip.

Figure 2:
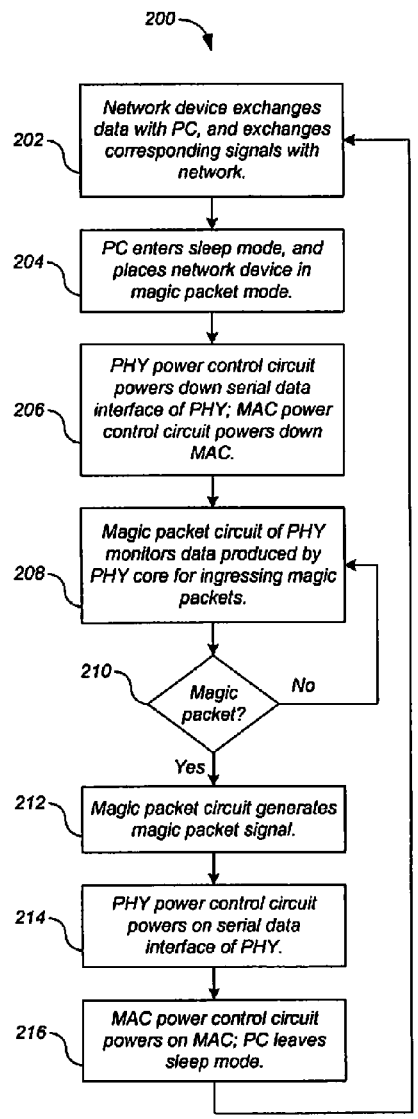
FIG. 2 shows a process for the data communication system of FIG. 1 according to some embodiments of the present invention.

FIG. 2 shows a process 200 for data communication system 100 of FIG. 1 according to some embodiments of the present invention. Although in the described embodiments, the steps of process 200 are presented in a particular order, the steps of process 200 may be performed differently. For example, in various embodiments, some or all of the steps of process 200 can be executed in a different order, concurrently, and the like.

Referring to FIG. 2, when not in magic packet mode, network device 102 exchanges data with PC 104, and exchanges corresponding signals with network 106 (step 202). On the ingress side, input circuit 122 of PHY 108 receives physical-layer signals representing data, and serializer 126 transmits a serial stream of the data to MAC 110, which passes the data to PC 104. On the egress side, PC 104 passes data to MAC 110, which transmits a serial stream of data to deserializer 128, and output circuit 124 transmits physical-layer signals representing the data to network 106.

When entering sleep mode, PC 104 places network device 102 in magic packet mode (step 204). For example, PC 104 asserts a magic packet mode signal, which can be conveyed to PHY 108 in any number of ways. For example, a management interface such as Management Data Input/Output (MDIO) can be used to set a bit in memory 118, which can be monitored by PHY power control circuit 120. As another example, a dedicated pin of an integrated circuit comprising PHY 108 can be used.

In response to the magic packet mode signal, PHY power control circuit 120 powers off serial data interface 114 of PHY 108 (step 206). In some embodiments, MAC power control circuit 130 powers off serial data interface 138 of MAC 110, and can power off MAC core 136, in response to the magic packet mode signal.

While in magic packet mode, magic packet circuit 116 of PHY 108 monitors the data produced by PHY core 112 for ingressing magic packets (step 208). In some embodiments, memory 118 stores a magic packet pattern that magic packet circuit 116 compares to the data produced by PHY core 112. The magic packet pattern can include the MAC address of MAC 110 so that magic packets addressed to other network devices do not match. Magic packet circuit 116 can also process the preamble, start-of-frame delimiter (SFD), and cyclic redundancy check (CRC) fields of ingressing packets.

When magic packet circuit 116 detects a magic packet (step 210), magic packet circuit 116 generates a magic packet signal (step 212). In response to the magic packet signal, PHY power control circuit 120 powers on serial data interface 114 of PHY 108 (step 214). In embodiments where the magic packet pattern includes a destination MAC address, magic packet circuit 116 generates the magic packet signal only when the destination MAC address in the magic packet pattern matches the MAC address of MAC 110.

The magic packet signal can also be communicated to MAC 110, and to PC 104. In response to the magic packet signal, MAC power control circuit 130 powers on serial data interface 138 of MAC 110, and can power on MAC core 136 as well (step 216). PC 104 awakens from sleep mode in response to the magic packet signal. Process 200 can then resume at step 202.

In some embodiments, the magic packet signal can take the form of an interrupt signal asserted on a pin of an integrated circuit comprising PHY 108. Memory 118 can store an interrupt mask bit, programmable over a management interface, to enable and disable assertion of the interrupt signal. In some embodiments, MAC 110 interrogates PHY 108 after receiving the magic packet signal, to ensure that PHY 108 has received a magic packet, before elements of MAC 110, and PC 104, are powered on. In other embodiments, the magic packet signal can take the form of a bit in memory 118 which is polled by MAC 110, for example over a management interface.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network device comprising:
a physical layer device comprising a first interface, wherein the physical layer device is configured to receive a plurality of packets including a first packet and a second packet, wherein the second packet comprises data; and
a media access controller comprising a second interface, wherein the second interface of the media access controller is connected to the first interface of the physical layer device,
wherein
the physical layer device is configured to, in response to receiving the first packet, (i) generate a power signal, (ii) transition at least one of the first interface and the second interface from being powered OFF to being powered ON, and (iii) output the power signal to the media access controller,
the media access controller is configured to (i) receive the power signal, (ii) in response to receiving the power signal, transition from being powered OFF to being powered ON, and (iii) subsequent to being powered ON, receive the second packet from the physical layer device via the first interface and the second interface,
the first interface of the physical layer device comprises a first serializer,
the first serializer is configured to, in response to the second packet, transmit a serial stream of the data of the second packet from the physical layer device to the media access controller,
the second interface of the media access controller comprises a first deserializer, and
the first deserializer is configured to deserialize the data of the second packet.

2. The network device of claim 1, the physical layer device is configured to (i) determine whether the first packet satisfies a predetermined criteria, and (ii) based on whether the first packet satisfies the predetermined criteria, generate the power signal.

3. The network device of claim 2, wherein the physical layer device is configured to (i) compare a portion of the first packet to a predetermined pattern while determining whether the first packet satisfies the predetermined criteria, and (ii) generate the power signal if the portion of the first packet matches the predetermined pattern.

4. The network device of claim 3, wherein:
the portion of the first packet comprises an address of the media access controller; and
the physical layer device is configured to generate the power signal if the address of the media access controller matches the predetermined pattern.

5. The network device of claim 1, wherein
the first interface comprises a second deserializer;
the second deserializer is configured to receive a serial stream of second data from the media access controller;
the media access controller is configured to receive the serial stream of second data from a host;
the physical layer device comprises a power circuit and is configured to receive a mode signal from the host; and
the power circuit is configured to (i) power OFF the first interface based on the mode signal, and (ii) power ON the first interface based on the power signal.

6. The network device of claim 1, wherein:
the media access controller is configured to receive (i) second data from a host, and (ii) a mode signal from the host;
the second interface comprises a second serializer;
the second serializer is configured to serialize the second data received from the host to generate a second stream of the second data;
the first interface comprises a second deserializer configured to deserialize the second stream of the second data; and the physical layer device comprises a power circuit configured to (i) power OFF the second interface based on the mode signal, and (ii) power ON the second interface based on the power signal.

7. The network device of claim 1, wherein the physical layer device is configured to:
   determine whether data of the first packet matches a predetermined pattern;
   generate the power signal if the data of the first packet matches the predetermined pattern; and
   refrain from generating the power signal in response to the data of the first packet not matching the predetermined pattern.

8. The network device of claim 1, wherein:
   the media access controller is configured to be powered OFF in response to a host transitioning to a sleep mode; and
   the physical layer device is configured to, in response to the physical layer device receiving the first packet, send a signal to the host to wake the host from the sleep mode.

9. The network device of claim 1, wherein the media access controller is:
   connected between the physical layer device and a host; and
   configured to transmit the second packet from the media access controller to the host.

10. A method comprising:
   receiving a plurality of packets at a physical layer device, wherein the plurality of packets comprise a first packet and a second packet, and wherein the physical layer device comprises a first interface that is connected to a second interface of a media access controller;
   in response to the physical layer device receiving the first packet, (i) generating a power signal via the physical layer device, (ii) transitioning at least one of the first interface and the second interface from being powered OFF to being powered ON, and (iii) outputting the power signal to the media access controller;
   in response to the media access controller receiving the power signal, (i) transitioning the media access controller from being powered OFF to being powered ON, and (ii) subsequent to being powered ON, receiving, at the media access controller, the second packet from the physical layer device via the first interface and the second interface;
   in response to the second packet, transmitting via a serializer a serial stream of data in the second packet from the physical layer device to the media access controller,
   wherein the first interface of the physical layer device comprises the serializer; and
   deserializing the data of the second packet via a deserializer,
   wherein the second interface of the media access controller comprises the deserializer.

11. The method of claim 10, further comprising, via the physical layer device:
   determining whether the first packet satisfies a predetermined criteria; and
   based on whether the first packet satisfies the predetermined criteria, generating the power signal.

12. The method of claim 11, further comprising, via the physical layer device:
   comparing a portion of the first packet to a predetermined pattern while determining whether the first packet satisfies the predetermined criteria; and
   generating the power signal if the portion of the first packet matches the predetermined pattern.

13. The method of claim 12, wherein:
   the portion of the first packet comprises an address of the media access controller; and
   the power signal is generated if the address of the media access controller matches the predetermined pattern.

14. The method of claim 10, further comprising, via the physical layer device:
   determining whether data of the first packet matches a predetermined pattern;
   generating the power signal if the data of the first packet matches the predetermined pattern; and
   refraining from generating the power signal in response to the data of the first packet not matching the predetermined pattern.

15. The method of claim 10, wherein:
   the media access controller is powered OFF in response to a host transitioning to a sleep mode; and
   in response to the physical layer device receiving the first packet, sending a signal to the host via the physical layer device to wake the host from the sleep mode.

16. The method of claim 10, further comprising transmitting the second packet from the media access controller to a host,
   wherein the media access controller is connected between the physical layer device and the host.

17. The network device of claim 1, wherein:
   the first packet includes a start-of-frame delimiter and a cyclic redundancy check field; and
   the physical layer device is configured to, based on (a) the start-of-frame delimiter of the first packet, (b) the cyclic redundancy check field of the first packet, and (c) whether the first packet has an address of the media access controller, (i) generate the power signal, (ii) transition the first interface or the second interface from being powered OFF to being powered ON, and (iii) output the power signal to the media access controller.

18. A network device comprising:
   a physical layer device comprising a core and a first interface, the first interface of the physical layer device comprising a first serializer, wherein the physical layer device is configured to receive a plurality of packets including a first packet and a second packet, and wherein the second packet comprises data; and
   a media access controller comprising a core and a second interface, the second interface of the media access controller comprising a first deserializer, wherein the second interface of the media access controller is connected to the first interface of the physical layer device, wherein the physical layer device is configured to, in response to receiving the first packet, (i) generate a power signal, (ii) transition at least one of the first interface and the second interface from being powered OFF to being powered ON, and (iii) output the power signal to the media access controller, the media access controller is configured to (i) receive the power signal, (ii) in response to receiving the power signal, transition from being powered OFF to being powered ON, and (iii) subsequent to being powered ON, receive the second packet from the physical layer device via the first interface and the second interface, the first deserializer is configured to deserialize the data of the second packet; and the first serializer is configured to, in response to the second packet, transmit a serial stream of the data of the second packet from the physical layer device to the media access controller.

19. The network device of claim 18, wherein:
   the physical layer device is configured to (i) determine whether the first packet has a predetermined pattern, (ii)

generate the power signal if the first packet has the predetermined pattern, and (iii) ignore packets received by the physical layer device that do not have the predetermined pattern, wherein the predetermined pattern includes an address of the media access controller;

the physical layer device is configured to generate the power signal if an address of the first packet is the address of the media access controller;

the media access controller is connected between the physical layer device and a computer; and the media access controller is configured to transmit the plurality of packets to the computer.

\* \* \* \* \*